United States Patent [19]
Kulka

[11] 3,963,883
[45] June 15, 1976

[54] TELEPHONE ENCLOSURE WITH SOUND PREVENTION MEANS

[76] Inventor: Thomas S. Kulka, 200 Film Bldg., 2108 Payne Ave., Cleveland, Ohio 44114

[22] Filed: July 29, 1974

[21] Appl. No.: 492,673

[52] U.S. Cl. .............................. 179/179; 179/81 E
[51] Int. Cl.² ......................................... H04M 1/19
[58] Field of Search ................. 179/179, 183, 81 E, 179/188, 189 R, 1.5 R

[56] References Cited
UNITED STATES PATENTS

| | | | |
|---|---|---|---|
| 925,775 | 6/1909 | Hutton et al. | 179/188 |
| 2,371,968 | 3/1945 | Lum | 179/183 X |
| 2,932,693 | 4/1960 | Wilcox, Jr. | 179/81 E X |
| 3,372,236 | 3/1968 | Schwartz | 179/81 E X |

FOREIGN PATENTS OR APPLICATIONS

| | | | |
|---|---|---|---|
| 9,732 | 4/1913 | United Kingdom | 179/179 |

*Primary Examiner*—Thomas W. Brown
*Attorney, Agent, or Firm*—Beall & Jeffery

[57] ABSTRACT

A device for preventing the unauthorized use of a telephone for surveillance purposes when the telephone is not in use, consisting of a sound-proof housing of sufficient size as to completely enclose the telephone and its handset. The sound-proof housing has means for acoustically isolating the enclosed telephone from reception of outside sounds when it is closed. Further means are provided to generate sounds within the sound-proof housing when it is closed and the telephone is not in use, so as to prevent surveillance of those sounds which might penetrate the housing.

5 Claims, 2 Drawing Figures

TELEPHONE ENCLOSURE WITH SOUND PREVENTION MEANS

BACKGROUND OF THE INVENTION

The present invention relates as indicated to an antisurveillance device which can prevent bugging of a telephone and relates more particularly to an enclosure for a telephone which completely surrounds the telephone in a sound-proof environment. Within the device, a signal generator emits noises that effectively interfere with those sounds which manage to penetrate the walls of the housing. The device is an obvious aid in improving security in any home, government office or business and eliminates the possibility that a telephone may be used to surreptitiously overhear private conversations.

Of all the methods presently employed in telephone surveillance, the most surreptitious of these is the "infinity bug". By the use of sophisticated electronic equipment, any telephone at short or long distance can be clandestinely converted into an open microphone. This is achieved even though the telephone is not in use and the handset is properly cradled. All sound and conversation that occurs in the vicinity of the telephone can therefore be heard and recorded. The present invention is a sound-proof enclosure in which the telephone is retained in complete isolation, thereby making such surveillance impossible. In addition, the device has an internal signal generator constantly emitting sounds in the confines of the enclosure. These generated signals cannot be heard outside the enclosure and are discontinued only when the enclosure is open for use of the telephone or when the signal generator power source is disconnected. An external telephone bell is provided to indicate incoming phone calls.

Enclosures for telephone devices have been shown generally in the prior art. However, they have not been of such a design as to prevent the bugging of the telephone, because the devices known previously have not been of such a design as to totally isolate the enclosed telephone from external sounds. For example, U.S. Pat. No. 925,775, is directed to a telephone box or casing which is weather-proof and constructed of sound absorbing material, but having an opening through which one may speak into the telephone transmitter. Such a device would clearly not be suitable for preventing the entry of all external sounds. Furthermore, no signal generating means is provided within the telephone box. U.S. Pat. No. 1,424,863, shows the use of a telephone box, the purpose of which is to prevent damage to a sub-station telephone from lightning. It consists of a lockable housing for holding the telephone equipment and has a key switch for disconnecting the equipment when not in use. The box has no sound insulating properties and would not prevent bugging by modern electronic equipment.

SUMMARY OF THE INVENTION

With the above in mind, a principal object of the present invention is to provide a device which will effectively prevent bugging of a room by converting an ordinary telephone into an open surveillance microphone. In accordance with the invention, the entire telephone is enclosed in a sound-proof box which effectively prevents the penetration of external sounds during the period when the telephone is not in use. The box is of simple construction and is inexpensive to manufacture. It is of such a nature that it cannot be circumvented by sophisticated electrical means.

A further object of the present invention is to provide a sound-proof telephone enclosure of the type described wherein a signal generator is provided within the enclosure to effectively interfere with any sound which might penetrate the sound-proof walls.

A still further object of the present invention is to provide an effective, low-cost, anti-bugging device which can be used with any ordinary telephone and can be installed with a minimum knowledge about electrical devices.

BRIEF DESCRIPTION OF THE APPLICATION DRAWINGS

In the application drawings:

FIG. 1 is a front elevational view of the telephone enclosure constructed in accordance with the present invention and having its door closed; and FIG. 2 is a front elevational view with the front wall broken away to expose the interior components and wall construction;

DETAILED DESCRIPTION OF THE PREFERRED EMBODIMENT

Figure 1:
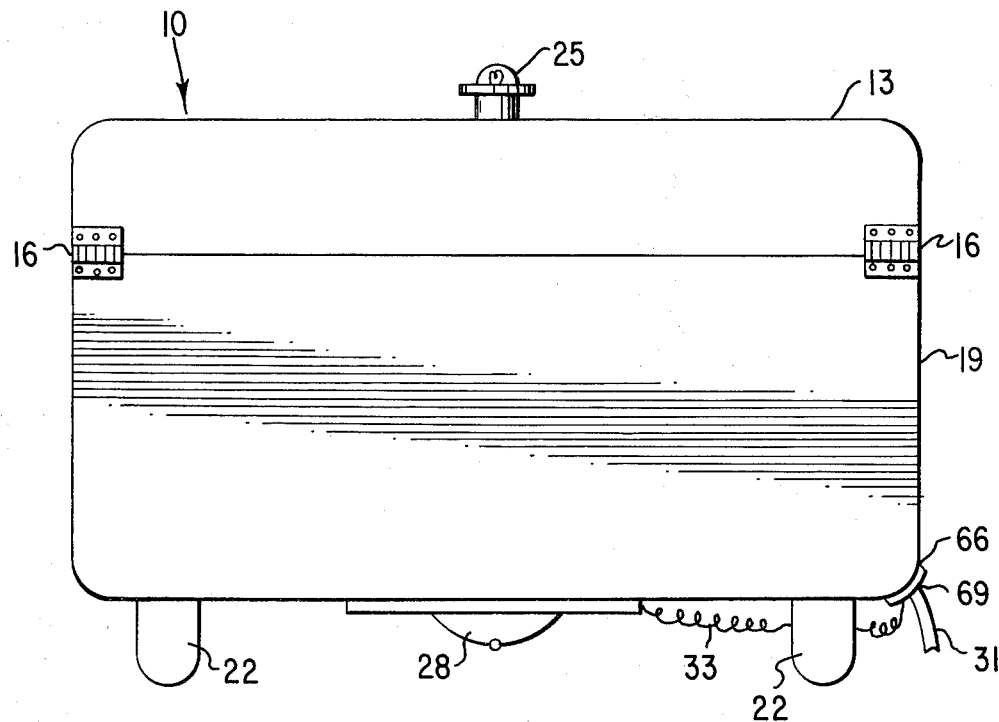

Referring now to the drawing in detail, wherein like parts are indicated by like reference numerals, there is shown in FIG. 1 a front elevational view of a preferred embodiment of the telephone enclosure constructed in accordance with the present invention. The enclosure 10 includes a base portion 19, with a cover 13 securely attached by hinges 16. The base 19 is supported by legs 22, and a bell or other external signal means 28 is attached to the outside thereof. A cable 31 which carries a normal telephone line 54 and a power line 36 enters the enclosure through a small grommeted hole 69. On the top of the lid 13 is mounted a lamp 25.

Figure 2:
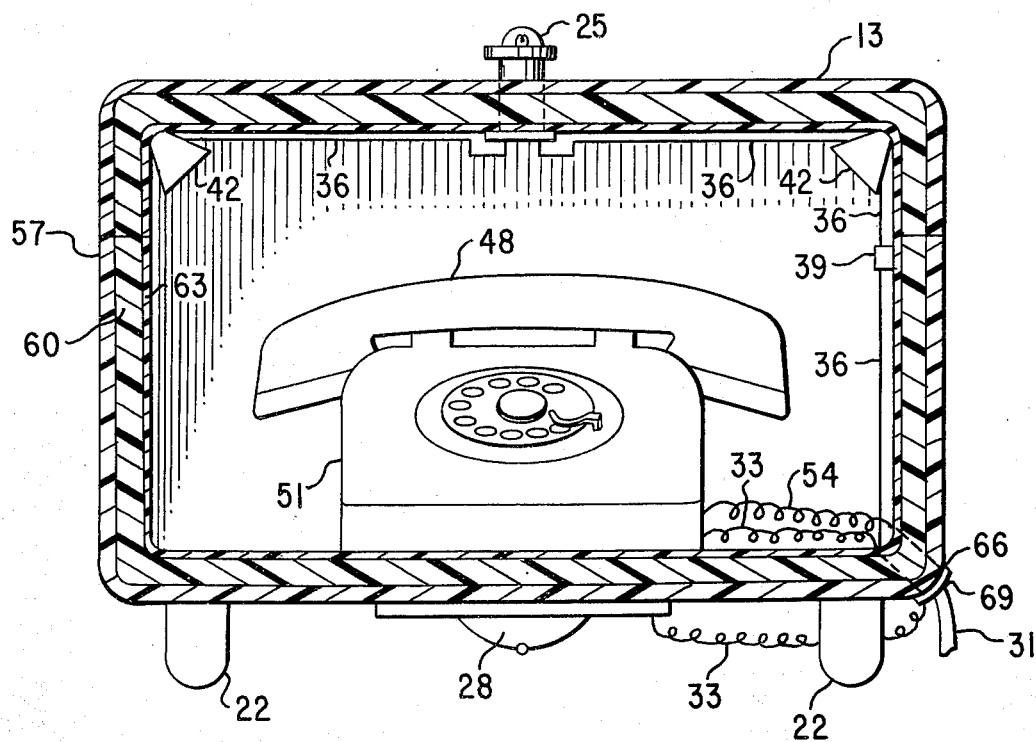

Reference will now be made to the components housed within the enclosure 10, as shown in FIG. 2. Wires 54 entering through cable 31 consist of an ordinary telephone line connected to a standard telephone 51. Handset 48 is shown cradled on the telephone. Wires 33 interconnect the telephone with external bell 28. Line 36 provides power for signal generators, shown generally at 42. Switch 39 is responsive to opening of enclosure lid 13 so as to disconnect the power source to signal generators 42 and signal lamp 25 when the lid is opened.

As shown in section in FIG. 2, the wall is preferably constructed of several layers of material, including an outer wall portion 57, an acoustical insulating layer 60 and an inner wall 63. The inner wall is preferably constructed of a molded synthetic resin material, the outer wall of molded vinyl, and the acoustical insulating barrier of a foamed synthetic resin material. Although the preferred wall construction employs synthetic resin materials, it is to be understood that any dense materials, such as rubber, wood, metal, for example, lead, or glass, or suitable combination of these materials, for example, leaded vinyl, may be employed for the wall construction. Additional layers of material of the types indicated may be added if necessary to provide more complete sound insulation.

Referring now to the operation of the telephone enclosure, the telephone 51 is positioned within enclosure 10 at all times. By opening lid 13, the telephone may be used in a normal fashion to place outgoing calls or to receive incoming calls. An incoming call is signaled by the ringing of bell 28 which is attached to the telephone by wires 33. This bell is audible even when lid 13 is left closed at all times and the enclosure prevents external sounds such as conversations in the room from being received by the telephone. The construction of the enclosure wall, shown at FIG. 2, is such as to prevent any sounds from entering, as discussed above.

A cable 36 which also enters the box through cable 31 provides power to signal generators 42 and signal lamp 25. Switch 39 is closed when lid 13 is closed, thus activating the signal generators and lighting signal lamp 25 which indicates that the signal generators are in operation. Switch 39 is opened when lid 13 is opened so that the signal generators are turned off and the telephone may be used in a normal fashion.

When the telephone is positioned within the closed box, it is effectively shielded from any conversations in the area surrounding the enclosure, due to the acoustical barrier wall construction. In addition, any external sounds which manage to penetrate the enclosure are interefered with by noises from signal generators 32. These generators may be in the form of a bell, buzzer, or transistorized circuit, all of which are well-known in the art.

When lid 13 is opened, switch 39 is also opened, which in turn stops the generation of noise by the signal generators and shuts off signal lamp 25. Thus, the telephone may be used in a normal fashion when lid 13 is opened.

In summary, the invention affords a telephone enclosure with sound prevention means whereby a standard telephone may be used in normal fashion at all times, yet may not be surreptitiously bugged and used as a means of overhearing private conversations. The enclosure can be manufactured at relatively low cost and the simple construction permits reliable operation under all conditions, essentially free of maintenance requirements.

I claim:

1. An apparatus for preventing the unauthorized use for surveillance purposes of a telephone when said telephone is not in use, wherein said telephone has a base and a handset, comprising:
   a. a sound inhibiting housing of sufficient size as to completely enclose said telephone base and handset, said housing including a base portion having an open upper end and a cover mating with said open upper end of said base portion thereby to define therewith an enclosure for said telephone base and handset, said base portion and said cover being constructed of material for acoustically isolating said enclosed telephone base and handset from reception of sounds external to said housing,
   b. signal means for providing a signal to indicate when said enclosed telephone is ringing, and
   c. signal generator means mounted within said housing for generating sounds within said housing when said housing is closed and said telephone is not in use, so as to prevent surveillance of those sounds in the vicinity of said housing.

2. The apparatus of claim 1, wherein the walls of said housing are constructed of one or more layers of sound barrier material.

3. The apparatus of claim 2, wherein said sound barrier material consists of a foamed synthetic resin material.

4. The apparatus of claim 1, further including an additional signal means outside said housing to indicate when said signal generator means is generating sounds within said sound-proof housing.

5. The apparatus of claim 4, wherein said external signal means comprises a visual indicator.

* * * * *